United States Patent
Edwards

(10) Patent No.: US 10,444,035 B2
(45) Date of Patent: Oct. 15, 2019

(54) MAGNETIC SENSING METERING DEVICE AND METHOD

(71) Applicant: Silver Spring Networks, Inc., San Jose, CA (US)

(72) Inventor: Bruce H. Edwards, San Jose, CA (US)

(73) Assignee: ITRON NETWORKED SOLUTIONS, INC., Liberty Lake, WA (US)

(*) Notice: Subject to any disclaimer, the term of this patent is extended or adjusted under 35 U.S.C. 154(b) by 219 days.

(21) Appl. No.: 15/610,841

(22) Filed: Jun. 1, 2017

(65) Prior Publication Data

US 2017/0350725 A1    Dec. 7, 2017

Related U.S. Application Data

(60) Provisional application No. 62/344,041, filed on Jun. 1, 2016.

(51) Int. Cl.
  *G01D 5/14*    (2006.01)

(52) U.S. Cl.
  CPC .................................. *G01D 5/147* (2013.01)

(58) Field of Classification Search
  CPC . G01D 5/147; G06Q 2240/00; G06Q 20/3278
  See application file for complete search history.

(56) References Cited

U.S. PATENT DOCUMENTS

| | | | | |
|---|---|---|---|---|
| 4,030,031 A | * | 6/1977 | Stucker | G01R 11/10 324/125 |
| 4,039,944 A | * | 8/1977 | Clift | G01R 5/08 324/150 |
| 7,113,063 B2 | | 9/2006 | Romanik et al. | |
| 8,111,063 B2 | | 2/2012 | Graff | |
| 8,138,751 B2 | | 3/2012 | Edwards | |
| 2011/0080162 A1 | * | 4/2011 | Steinich | G01B 7/30 324/207.25 |

* cited by examiner

*Primary Examiner* — Jermele M Hollington
*Assistant Examiner* — Alvaro E Fortich

(57) ABSTRACT

Methods and systems for implementing a rotation sensing device are provided. The rotation sensing device may include a magnet, a magnetic field sensor located in a fixed position relative to the magnet, the magnetic field sensor configured to sense a magnetic field of the magnet, and a flux conductor configured to alter the magnetic field of the magnet, wherein the flux conductor is mounted to a rotatable element. The magnet may be mounted in a fixed position relative to the flux conductor, and the magnetic field sensor may be configured to generate a signal based on a sensed strength of the magnetic field in accordance with rotation of the flux conductor.

27 Claims, 10 Drawing Sheets

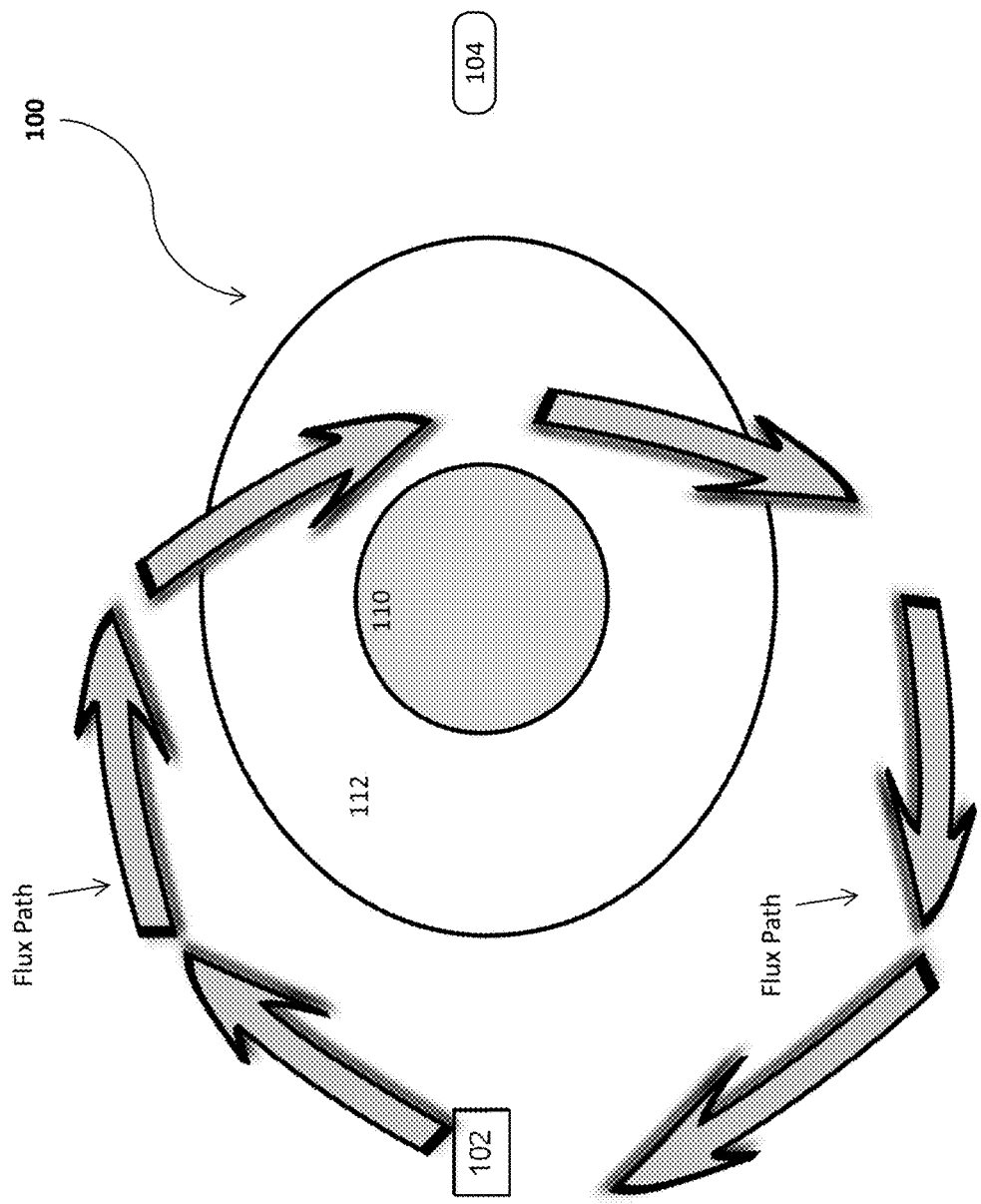

MAGNETIC SENSING METERING DEVICE AND METHOD

PRIORITY

This application claims the priority benefit of U.S. Provisional Application No. 62/344,041, filed Jun. 1, 2016, the subject matter of which is herein incorporated by reference in its entirety.

FIELD

The present disclosure relates to rotation sensing devices, such as to rotation sensing devices used to measure a quantity, degree, or rate of something and/or some material.

BACKGROUND

Utility companies use meters to measure various commodities. These commodities can include resources like electricity, gas, and water. Meters can include a dial device that can indicate the amount of the commodity consumed. For example, the dial can indicate a volume of gas that has been consumed over time by a household. The dial may move responsive to the gas moving through a metering valve.

SUMMARY

The present disclosure provides a description of rotation sensing devices and sensing rotation, such as through the use of magnetic fields and magnetic flux paths. Rotation sensing devices may include a rotatable element that may indicate consumption of a material. For example, a meter (e.g., utility meter, etc.) may include a dial or index that may rotate based on a consumed resource, such as gas, electricity, or water. In some cases, the meter may be configured so that the number of rotations (or partial rotations) of the rotatable element may indicate (e.g., be proportional to) the volume of the material passing through a metering valve. In some situations, the rotatable element may indicate the amount of consumption of the resource according to number the rotations of the rotating device. In some cases, the meter may indicate, record, and/or measure time or an amount of something (e.g., a parking meter).

Aspects described herein provide for a rotation sensing device that may include a magnet, a magnetic field sensor located in a fixed position relative to the magnet, the magnetic field sensor configured to sense a magnetic field of the magnet, and a flux conductor configured to alter the magnetic field of the magnet, wherein the flux conductor is mounted to a rotatable element. The magnet may be mounted in a fixed position relative to the flux conductor, and the magnetic field sensor may be configured to generate a signal based on a sensed strength of the magnetic field in accordance with rotation of the flux conductor.

Aspects described herein provide for a method of sensing rotation that may include generating a magnetic field by a magnet disposed at a fixed location, altering the generated magnetic field via flux conductor mounted to an element that rotates relative to the magnet, sensing, by a magnetic field sensor, a magnetic field strength of the generated magnetic field, wherein the magnetic field sensor is located in a fixed position relative to the magnet, and generating, by the magnetic field sensor, a signal based the sensed magnetic field strength.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 1D is a front view of an exemplary rotation sensing device in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Figure 1A:
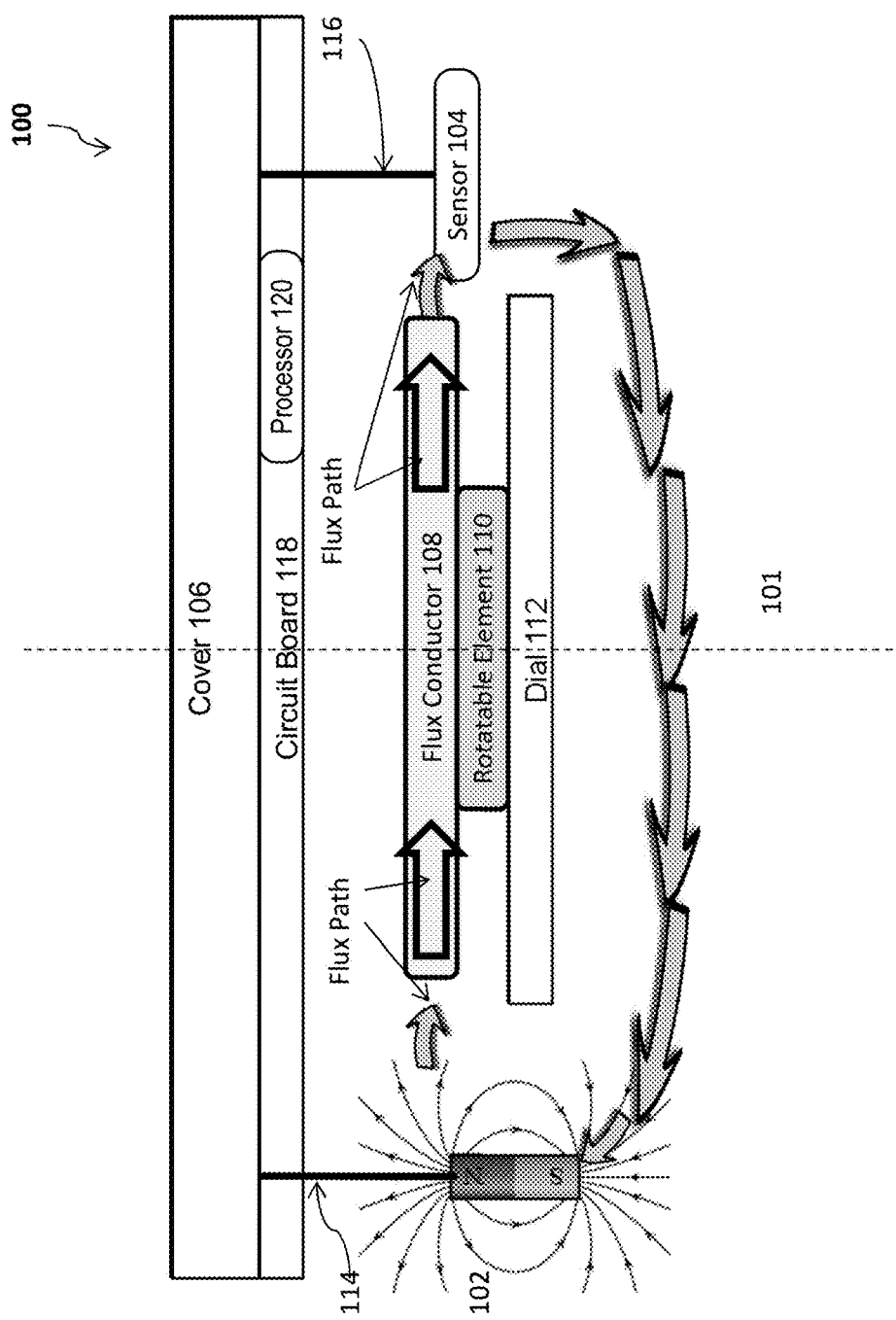
FIG. 1A is a top view of an exemplary rotation sensing device in accordance with exemplary embodiments.

FIG. 1A illustrates a top view of an exemplary embodiment of a rotation sensing device 100 in a first configuration. In some embodiments, the rotation sensing device 100 may be part of or may be a meter (e.g., utility meter, time meter, parking meter, etc.) The rotation sensing device 100 may include a magnet 102, a magnetic field sensor 104, and a housing or cover 106. According to some aspects, the magnet 102 and/or the magnetic field sensor 104 may be attached to or mounted to the cover 106, such as via the attachment structures 114 and/or 116. In some embodiments, the magnet 102 and/or the magnetic field sensor 104 may be attached or mounted directly to the cover 106 or to another component of the rotation sensing device 100, such as a printed circuit board 118. The rotation sensing device 100 may include a flux conductor 108, which may be mounted to or attached to a rotatable element 110. The rotatable element 110 may be attached to a dial 112 (e.g., an index, a register, etc.), which may indicate a quantity or measure of a material or something else (e.g., time, etc.). In some embodiments, the flux conductor 108 may be the rotatable element 110. According to some aspects, one or more ends or legs of the flux conductor 108 can extend over the rotatable element 110. In some embodiments, the rotatable element 110 may be a dial hand of the dial 112 and may rotate based on a measured quantity, which may indicate consumption of a material. The flux conductor 108 and/or the rotatable element 110 may rotate about an axis of rotation 101, such as in a clockwise or counter-clockwise manner about the axis of rotation 101. The rotation sensing device 100 may include a printed circuit board 118 and a processing device 120 (e.g., a computer processor having a memory device), which may be attached to the cover 106. The magnet 102 and/or the magnetic field sensor 104 may be coupled to the printed circuit board 118 and/or to the processing device 120. In some embodiments, the processing device 120 may communicate with the magnetic field sensor 104 wirelessly and/or via a wire or other connecting device (e.g., via the circuit board 118, etc.).

The magnet 102 may be an electromagnet or a permanent magnet such as neodymium. The magnet 102 may be configured in any manner. For example, as shown in FIG. 1A, the north pole of the magnet 102 may face the cover 106, and the south pole of the magnet 102 may face the dial 112. The magnetic field sensor 104 may be a reed switch, a Hall effect sensor, a magneto resistive element, and the like. The magnetic field sensor 104 may be located in a fixed position relative to the magnet 102. For example, the magnet 102 and the magnetic field sensor 104 may be fixedly mounted to the cover 106. In another example, the magnet 102 may be mounted to the cover 106 and the magnetic field sensor 104 may be mounted to the circuit board 118. In another example, the magnet 102 and or magnetic field sensor 104 may be mounted to the dial 112 or to another component of the rotation sensing device 100.

The magnetic field sensor 104 may be configured to detect the presence of the magnet 102. For example, the magnetic field sensor 104 may sense a magnetic field generated by the magnet 102. According to some aspects, the magnet 102 may be located at a distance from the magnetic field sensor 104, such that the distance is sufficiently far enough to prevent the magnetic field sensor 104 from detecting the presence of the magnet 102, such as by not sensing the magnetic field generated by the magnet 102. For example, the distance between the magnet 102 and the magnetic field sensor 104 may be a function of the magnetic field strength of the magnet 102 or may be a function of the sensitivity of the magnetic field sensor 104, such that the magnetic field strength might not be normally not sensed by the magnetic field sensor 104. In some scenarios, the magnet 102 and the magnetic field sensor 104 may be spaced apart based on the strength of the magnet 102 and on the sensitivity of the magnetic field sensor 104 such that the strength of magnetic field sensed by the magnetic field sensor 104 is below a threshold value that might not activate the magnetic field sensor 104.

According to some aspects, the magnetic field sensor 104 may sense the magnetic field strength of the magnetic field in accordance with or based on the rotation of the flux conductor 108. The flux conductor 108 may be composed of a material with high relative permeability (e.g., low magnetic resistance), such as iron, nickel, or cobalt. For example, the flux conductor 108 may be a magnetically conductive strip of metal, which might not be magnetized. Table 1 below shows a list of materials and respective relative permeability for each of these materials.

TABLE 1

| Material | Relative Permeability |
| --- | --- |
| Copper | 0.9999906 |
| Silver | 0.9999736 |

TABLE 1-continued

| Material | Relative Permeability |
| --- | --- |
| Lead | 0.9999831 |
| Air | 1.00000037 |
| Oxygen | 1.000002 |
| Aluminum | 1.000021 |
| Titanium 6-4 (Grade 5) | 1.00005 |
| Palladium | 1.0008 |
| Platinum | 1.0003 |
| Manganese | 1.001 |
| Cobalt | 250 |
| Nickel | 600 |
| Iron | 280,000 |

Accordingly, a suitable material for the flux conductor 108 may be one with a high relative permeability and/or low magnetic resistance. In the context of this application, "high relative permeability" means a relative permeability of about 5 or higher.

The flux conductor 108 may have any shape. For example, the flux conductor 108 may have a substantially elongated shape. The flux conductor 108 may have length and a width, such that the length may be longer than a width. The flux conductor 108 may have one or more substantially broad surfaces, such that one of the broad surfaces may be adjacent to and/or attached to the rotatable element 110. In some embodiments, the flux conductor 108 may comprise two broad surfaces, one on each of the opposing sides of the flux conductor 108.

Figure 1B:
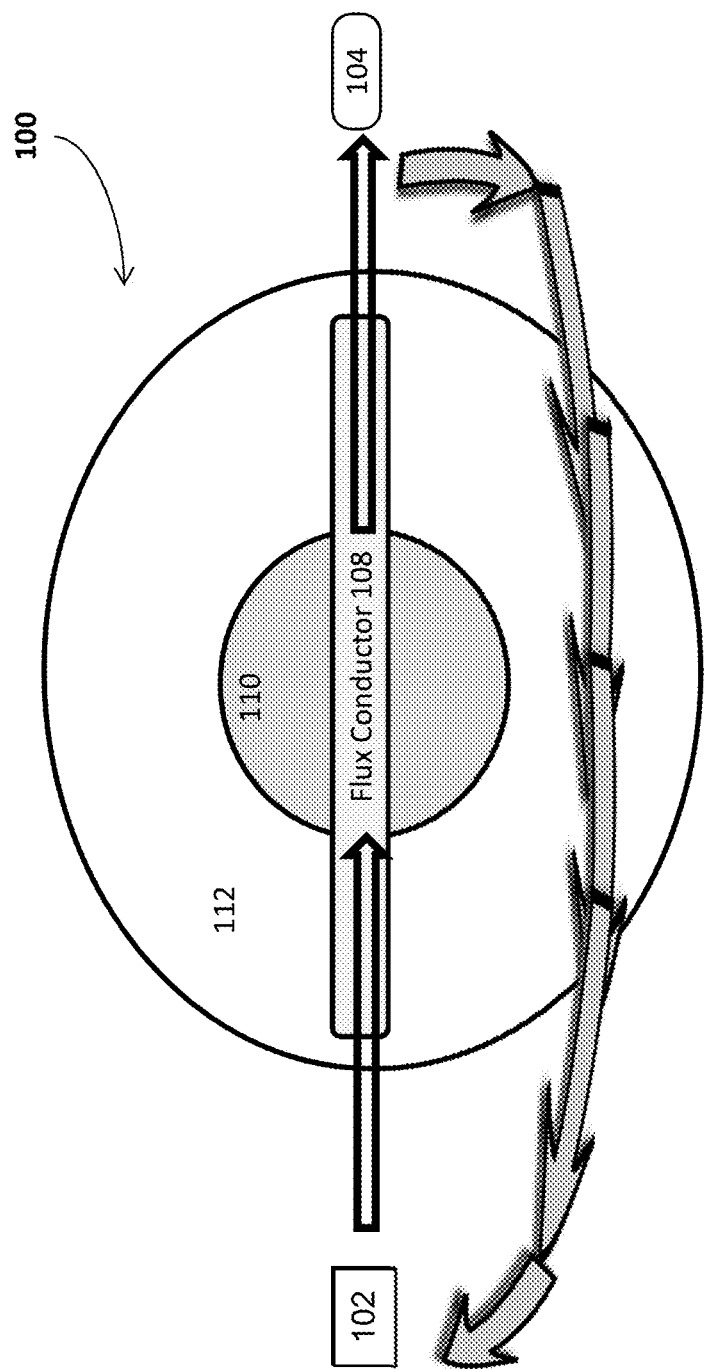
FIG. 1B is a front view of an exemplary rotation sensing device in accordance with exemplary embodiments.
Figure 1C:
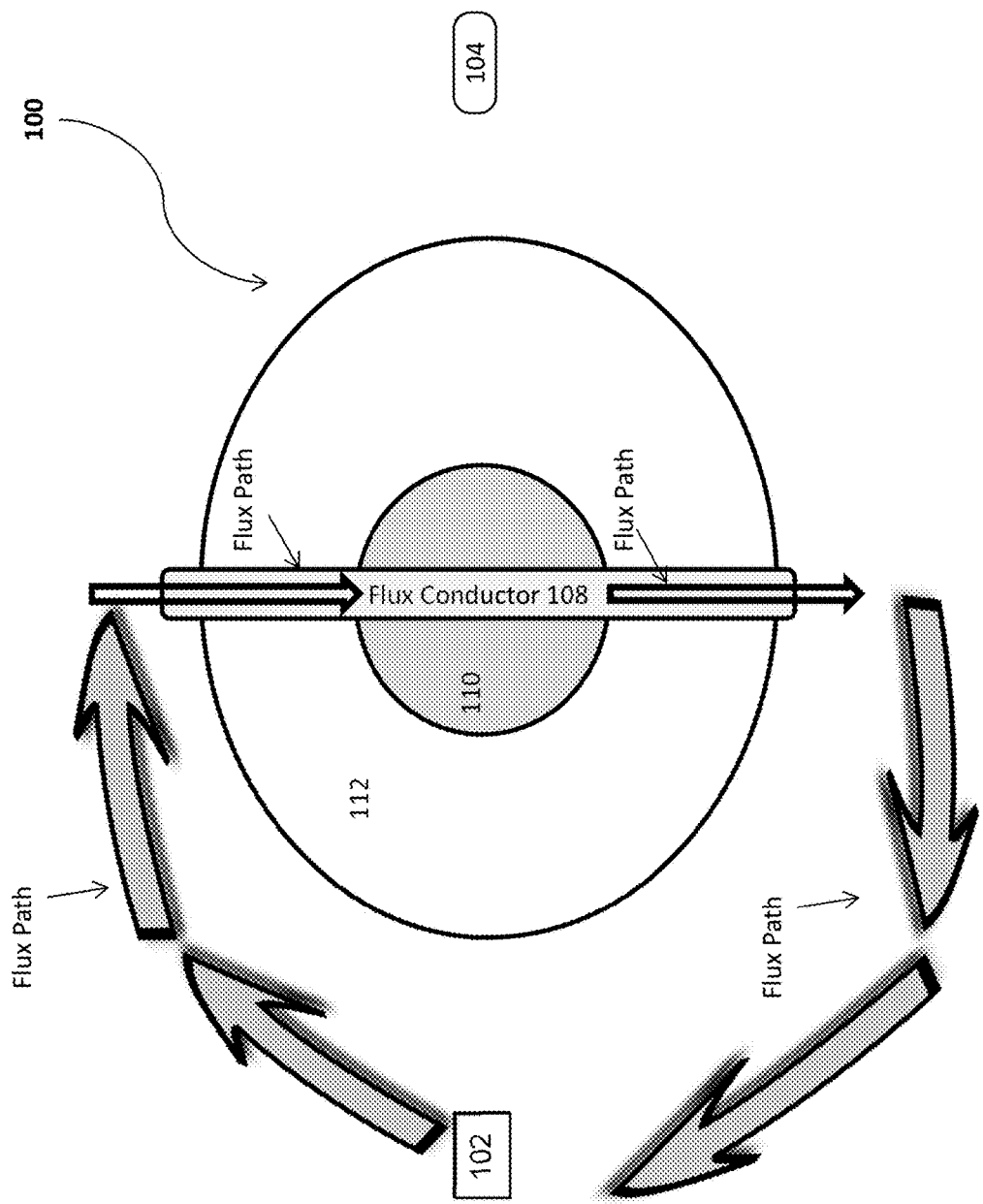
FIG. 1C is a front view of an exemplary rotation sensing device in accordance with exemplary embodiments.

In some embodiments, as the rotating rotatable element 110 rotates, the flux conductor 108 may alternatively enhance a magnetic flux path between the magnet 102 and the magnetic field sensor 104, which may cause the magnetic field sensor 104 to activate, such as if the flux path is enhanced, or may cause the magnetic field sensor 104 to deactivate (or otherwise be non-activated), such as if the enhancement to the flux path is removed. For example, because the flux conductor 108 exhibits a high relative permeability, such as compared to the surrounding fluid or gas (e.g., water, air, vacuum, etc.), the flux conductor 108 may enable the generated magnetic field or magnetic flux to follow a flux path along the length or longitudinal direction of the flux conductor 108, such as shown in FIGS. 1A-1C. In an example where the magnetic field sensor 104 comprises a switch, such as a reed switch, the activated state of the magnetic field sensor 104 may correspond to a closed state of the switch, and the deactivated state of the magnetic field sensor 104 may correspond to an opened state of the switch. In an example where the magnetic field sensor 104 comprises a Hall effect sensor or a magneto resistive element, the magnetic field sensor 104 may generate a signal, such as a voltage signal or an electrical resistance signal, which may be based on or a function of (e.g., proportional to, etc.) the strength of a sensed magnetic field. In some of these embodiments, one or more thresholds may be used (e.g., by the processing device 120) to distinguish between an activated state and a deactivated state.

FIG. 1B illustrates a front view of the rotation sensing device 100. FIG. 1B may be a front view of the top view shown in FIG. 1A. The magnet 102 and the magnetic field sensor 104 may be located a distance apart, such that the magnet 102's magnetic field (shown via the flux path) might not normally be sensed or detected by the magnetic field sensor 104, such as illustrated in FIG. 1D, which shows a front view of the rotation sensing device 100 configured without the flux conductor 108. Referring back to FIG. 1B, as the rotatable element 110 rotates (e.g., based on consumption of a material, like natural gas), the flux conductor 108 (which may be mounted or fixed to the rotatable element 110) may also rotate, such as about the axis 101. As the flux conductor 108 rotates to a position, such as shown in FIGS. 1A and 1B, such that the flux conductor 108 may be substantially longitudinally aligned between the magnet 102 and the magnetic field sensor 104, the flux conductor 108 may cause the magnetic field strength to be sensed by the magnetic field sensor 104. For example, the flux conductor 108 may direct the magnetic flux towards the magnetic field sensor 104 to effectively enhance or extend the magnetic field along the length or longitudinal direction of the flux conductor 108, which may enable the magnetic field (i.e., the magnetic field strength) to be detected or sensed by the magnetic field sensor 104. For example, because the magnet 102's magnetic field might not normally be sensed or detected by the magnetic field sensor 104, the extension of the magnetic flux path along the length of the flux conductor 108 may enable the magnetic field sensor 104 to detect the magnetic field. According to some aspects, the magnetic field sensor 104 may activate responsive to detecting or sensing the magnetic field. For example, the magnetic field sensor 104 may normally be in an deactivated state because the magnetic field sensor 104 might normally not sense the magnetic field generated by the magnet 102. In the deactivated state, the magnetic field sensor 104 may produce a signal indicating the deactivated state, such as a low signal (e.g., a digital "0"), such as via the circuit board 118 and/or processing device 120.

Figure 2A:
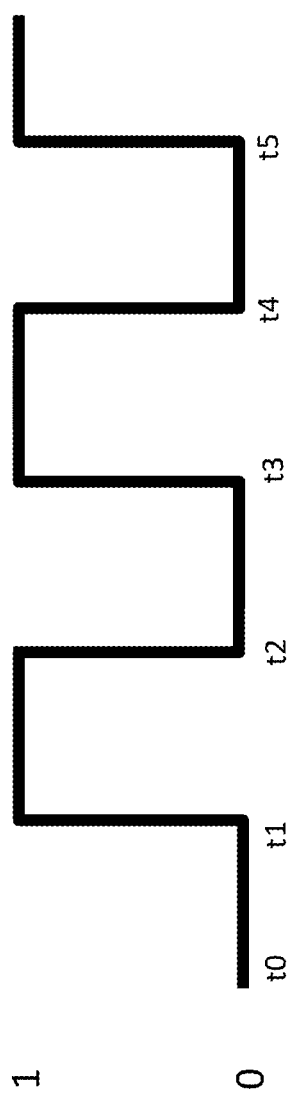
FIG. 2A is a diagram illustrating a digital signal output of a rotation sensing device in accordance with exemplary embodiments.

An illustration of the exemplary signals generated by the magnetic field sensor 104 may be shown in FIG. 2A. As shown in FIG. 2A, the signal may begin at a low state at time t0, such as when the magnetic field sensor 104 might not detect the magnetic field and may be in a deactivated state. As the flux conductor 108 rotates to a position as shown in FIG. 1B, the magnetic field sensor 104 may detect the magnetic field due to the enhancement or extension of the flux path between the magnet 102 and the magnetic field sensor 104, and the magnetic field sensor 104 may activate at time t1. In the activated state, the magnetic field sensor 104 may generate a high signal (e.g., a digital "1"), such as via the circuit board 118 and/or processing device 120. As shown in FIG. 2A, the signal may be at a high state if the magnetic field sensor 104 detects the magnetic field (or detects a threshold value of the magnetic field strength), such as if the flux conductor 108 is configured as shown in FIG. 1B. In embodiments where the magnetic field sensor 104 comprises a Hall effect sensor or a magneto resistive element, the magnetic field sensor 104 may generate a voltage signal based on the strength of a sensed magnetic field. In these embodiments, the signal generated by the magnetic field sensor 104 may also oscillate between a high value and a low value. In some of these embodiments, one or more thresholds may be used (e.g., by the processing device 120) to distinguish between an activated state that may result in a high signal (e.g., a digital "1") and a deactivated state that may result in a low signal (e.g., a digital "0").

FIG. 1C illustrates a front view of the rotation sensing device 100. As illustrated, the magnet 102 and the magnetic field sensor 104 may be located a distance apart, such that the magnet 102's magnetic field might not normally be sensed or detected by the magnetic field sensor 104. As the rotatable element 110 rotates (e.g., based on consumption of a material, like natural gas), the flux conductor 108 (which may be mounted or fixed to the rotatable element 110) may also rotate, such as about the axis 101 shown in FIG. 1A.

The flux conductor 108 may rotate to a position, such as shown in FIG. 1C, such that the flux conductor 108 might not be substantially longitudinally aligned between the magnet 102 and the magnetic field sensor 104. For example, the length of the flux conductor 108 may be oriented substantially transverse to a path between the magnet 102 and the magnetic field sensor 104 (e.g., transverse to a substantially straight path between the magnet 102 and the magnetic field sensor 104).

In some embodiments, if the length of the flux conductor 108 is not substantially aligned between the magnet 102 and the magnetic field sensor 104, the flux conductor 108 may cause the strength of the magnetic field in the vicinity of the sensor 104 to be diminished. For example, the flux conductor 108 may divert the magnetic field along the length of the flux conductor, which may effectively divert the magnetic field away from the magnetic field sensor 104. In such situations, because the flux conductor 108 might not be enhancing the flux path between the magnet 102 and the magnetic field sensor 104, the magnetic field strength might not be sensed by the magnetic field sensor 104, such as in the default situation where the magnetic field might not be normally sensed by the magnetic field sensor 104 (e.g., as shown in FIG. 1D), and the magnetic field sensor 104 may deactivate. In the deactivated state, the magnetic field sensor 104 may generate a low signal (e.g., a digital "0"), such as at time t2, as shown in FIG. 2A. In some embodiments, the flux conductor 108 may provide a low resistance flux path for the generated magnetic field along the length of the flux conductor 108, such that the flux path from one pole of the magnet 102 (e.g., north) enters one end of the flux conductor 108 and out the other end of the flux conductor 108 to the other pole of the magnet 102. In these embodiments, and where the length of the flux conductor 108 may be oriented substantially transverse to a path between the magnet 102 and the magnetic field sensor 104, the magnetic field might not be sensed by the magnetic field sensor 104, and the magnetic field sensor may generate a low signal (e.g., a digital "0").

According to some aspects, as the flux conductor 108 rotates 180 degrees from the position shown in FIG. 1B, the flux conductor 108 may again enhance the flux path between the magnet 102 and the magnetic field sensor 104, such that the magnetic field sensor 104 may detect the magnetic field, activate, and generate a high signal indicating an activated state at time t3, such as shown in FIG. 2A. The magnetic field sensor 104 may continue (e.g., at times t4, t5, etc.) to generate such a signal shown in FIG. 2A based on the rotation of the flux conductor 108.

According to some aspects, in the context of a meter, the rotation sensing device 100 may be used to sense or count rotations of the rotatable element 110 (e.g., a rotating index hand), which can measure or indicate the amount of consumption of a quantity or material (e.g., gas, electricity, water, time, etc.). For example, the processing device 120 may count rotations based on the signals produced by the magnetic field sensor 104. In one example, the processing device 120 may count a full rotation if the magnetic field sensor 104 generates a low signal, a high signal, a low signal, and a high signal, which may indicate a 360 degree rotation of the rotatable hand 110 and/or flux conductor 108. Alternatively or additionally, the processing device 102 may count a full rotation if the magnetic field sensor 104 generates a high signal, a low signal, a high signal, and a low signal. Other permutations and combinations may be used by the processing device 120 to count a rotation. According to some aspects, the processing device 102 may count partial rotations based on the signal generated by the magnetic field sensor 104. For example, the processing device 102 may count a ½-rotation (half rotation) if the magnetic field sensor 104 generates a low signal and a high signal, or alternatively, a high signal and a low signal.

Figure 3A:
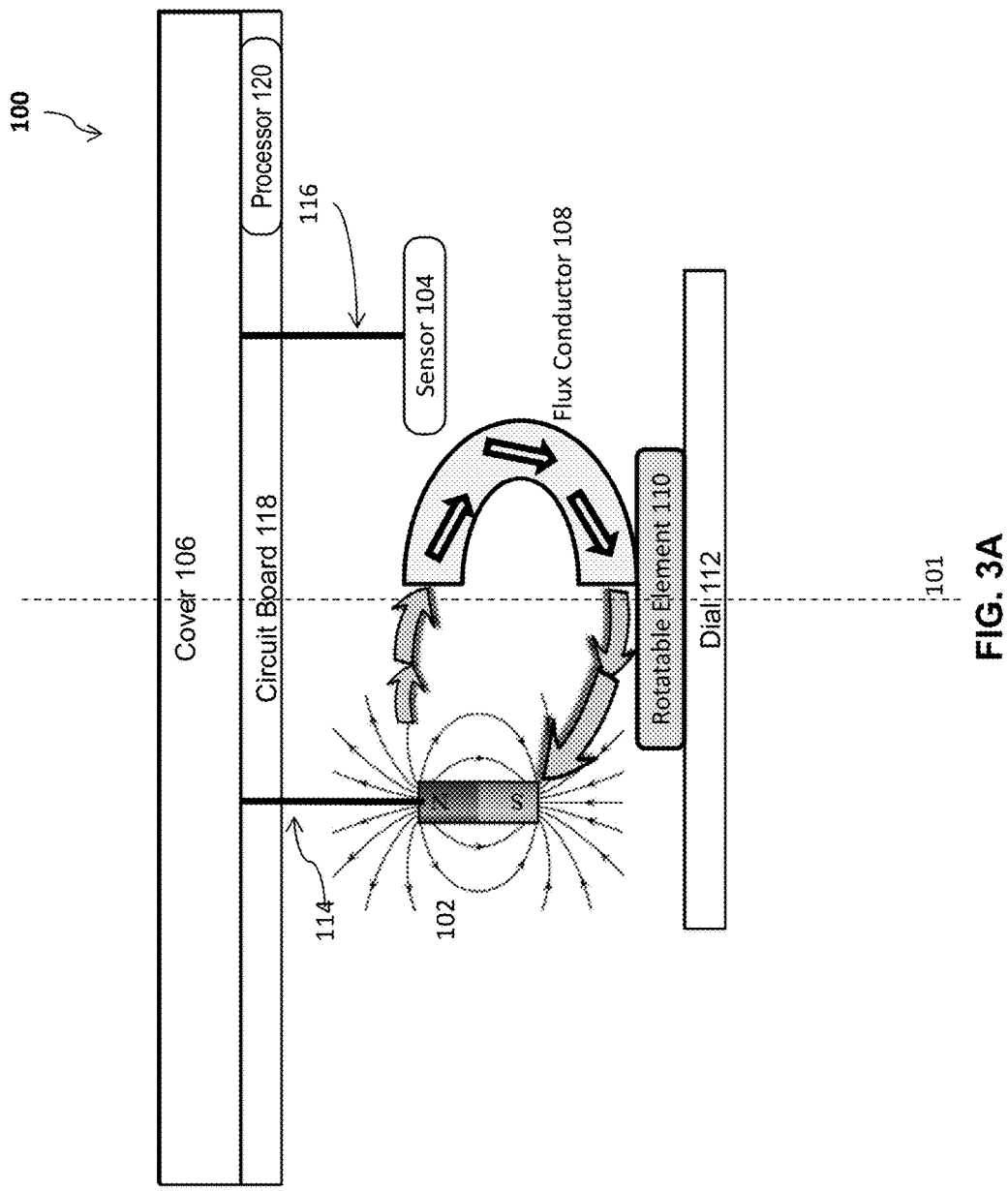
FIG. 3A is a top view of an exemplary rotation sensing device in accordance with exemplary embodiments.

FIG. 3A illustrates a top view of an exemplary embodiment of the rotation sensing device 100 in a second configuration, which may include one or more components as described with respect to FIG. 1A-1C. For example, the rotation sensing device 100 may include a magnet 102, a magnetic field sensor 104, a cover 106, and a flux conductor 108, which may be attached to a rotatable element 110, which may be attached to a dial 112. In some embodiments, the flux conductor 108 may be the rotatable element 110. The magnet 102 may be configured in any manner. For example, as shown in FIG. 3A, the north pole of the magnet 102 may face the cover 106, and the south pole of the magnet 102 may face the dial 112. The magnetic field sensor 104 may be located in a fixed position relative to the magnet 102. The flux conductor 108 and the rotatable element 110 may rotate about an axis of rotation 101, such as in a clockwise or counter-clockwise manner about the axis 101. The rotation sensing device 100 may include a printed circuit board 118 and a processing device 120. The magnet 102 and/or the magnetic field sensor 104 may be attached or mounted to the cover 106, and in some embodiments mounted via respective attachment structures 114 or 116. In some embodiments, the magnetic field sensor 104 may be coupled to the circuit board 118 and/or processing device 120 via an attachment structure, such as a wire, or may be wirelessly coupled.

Figure 3B:
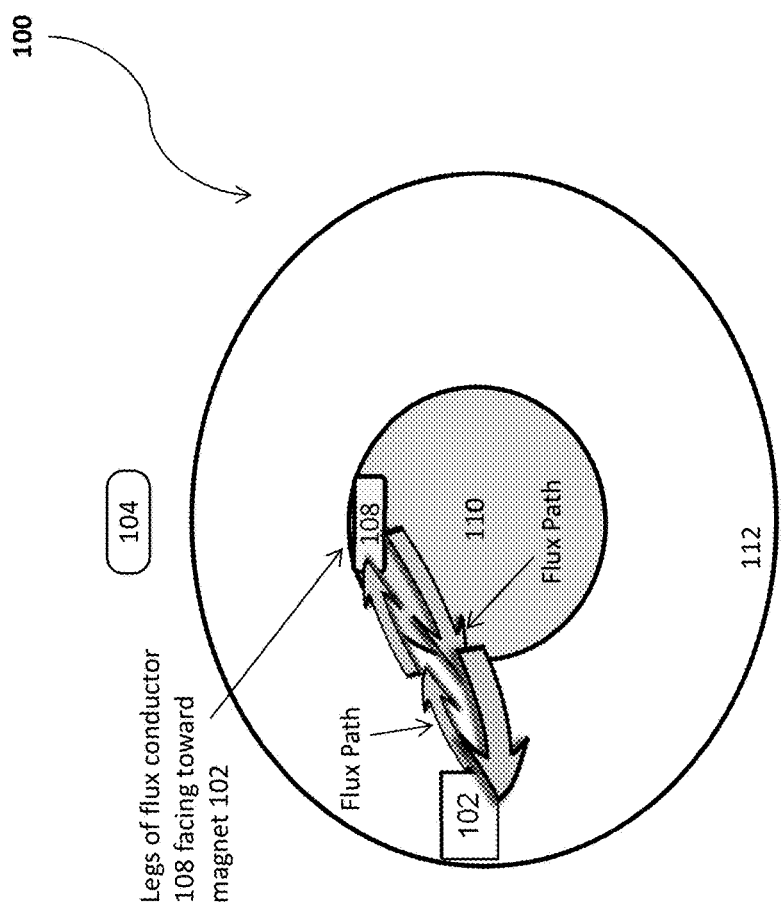
FIG. 3B is a front view of an exemplary rotation sensing device in accordance with exemplary embodiments.

According to some aspects, the magnet 102 may be located at a distance from the magnetic field sensor 104, such that the distance is sufficiently close enough to enable the magnetic field sensor 104 to the presence of the magnet 102, such as by detecting the presence of a magnetic field (i.e., magnetic field strength) generated by the magnet 102. For example, the distance between the magnet 102 and the magnetic field sensor 102 may be a function of the magnetic field strength of the magnet 102 or on the sensitivity of the magnetic field sensor 104, such that the magnetic field strength may be normally sensed by the magnet field magnetic field sensor 104, such as shown in FIG. 3D, which shows a front view of the rotation sensing device 100 configured without the flux conductor 108. In some scenarios, the magnet 102 and the magnetic field sensor 104 may be spaced apart based on the strength of the magnet 102 and on the sensitivity of the magnetic field sensor 104 such that the strength of magnetic field sensed by the magnetic field sensor 104 may be greater than a threshold value that may activate the magnetic field sensor 104.

According to some aspects, the magnetic field sensor 104 may sense the strength of the magnetic field in accordance with or based on the rotation of the flux conductor 108. As the rotatable element 110 rotates (e.g., based on consumption of a material, like natural gas), the flux conductor 108 (which may be mounted or fixed to the rotatable element 110) may also rotate, such as about the axis 101. The rotation of the flux conductor 108 may be configured to divert a magnetic flux path between the magnet 102 and the magnetic field sensor 104 via the flux conductor, which might cause the magnetic field to be not sensed by the magnetic field sensor 104. For example, as shown in FIG. 3A, the flux conductor 108 may be "U-shaped" or shaped like an arch, and one of the legs of the arch may be attached to the rotatable element 110. In some other embodiments, the flux conductor 108 may have a substantially elongated shape.

The flux conductor 108 may extend in a vertical direction, such that the length of the flux conductor 108 may extend vertically from the rotatable element 110 and/or dial 112 towards the cover 106. As the flux conductor 108 rotates to a position, such as shown in FIG. 3A and 3B, the magnetic field generated by the magnet 104 may follow a flux path into and out of the arch shape of the flux conductor 108, in a manner to provide a low magnetic resistance flux path between the poles of the magnet 104. For example, the flux conductor 108 may rotate to the position shown in FIGS. 3A and 3B, so that the "open" end of the arch (i.e., the two legs of the flux conductor 108) may face the magnet 102 and/or be proximate to the magnet 102. According to some aspects, the magnetic flux path from one pole of the magnet (e.g., north pole) may enter into one leg of the arch may follow the arch, where the magnetic flux path may exit the other leg of the arch and into the opposite magnetic pole of the magnet 104 (e.g., south pole).

Figure 2B:
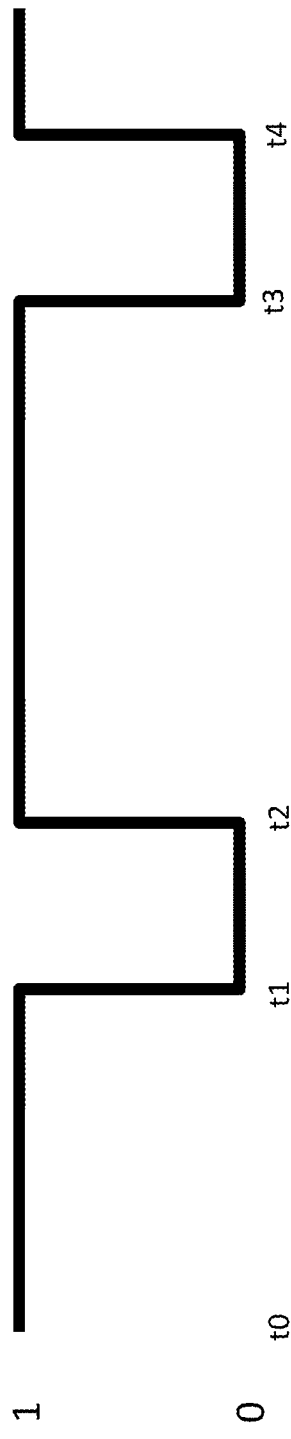
FIG. 2B is a diagram illustrating a digital signal output of a rotation sensing device in accordance with exemplary embodiments.

According to some aspects, the magnetic field sensor 104 may deactivate responsive to no longer detecting or sensing the magnetic field generated by the magnet 102. For example, the magnetic field sensor 104 may normally be in an activated state because the sensor may normally sense the magnetic field generated by the magnet 102, such as shown in FIG. 3D, which shows a front view of the rotation sensing device 100 configured without the flux conductor 108. In the activated state, the sensor may produce a signal indicating the activated state, such as a high signal (e.g., a digital "1"), such as via the circuit board 118 and/or processing device 120. An illustration of the exemplary signals generated by the magnetic field sensor 104 may be shown in FIG. 2B. As shown in FIG. 2B, the signal may begin at a high state at time t0, such as when the magnetic field sensor 104 may detect the magnetic field and may be in an activated state.

As the flux conductor 108 rotates to a position as shown in FIG. 3B, the magnetic field sensor 104 might not detect the magnetic field due to the flux conductor 108 diverting the flux path between the magnet 102 and the magnetic field sensor 104, and the magnetic field sensor 104 may deactivate. In the deactivated state, the magnetic field sensor 104 may generate a low signal (e.g., a digital "0") at time t1, such as via the circuit board 118 and/or processing device 120. As shown in FIG. 2B, the signal may be at a low state if the magnetic field sensor 104 does not detect the magnetic field (or does not detect a threshold value of the magnetic field strength). According to some aspects, the magnetic field sensor 104 may activate responsive to detecting or sensing the magnetic field, and may generate a high signal indicating an activated state at time t2, such as if the flux conductor 108 rotates to another position, such as shown in FIG. 3C.

Figure 3C:
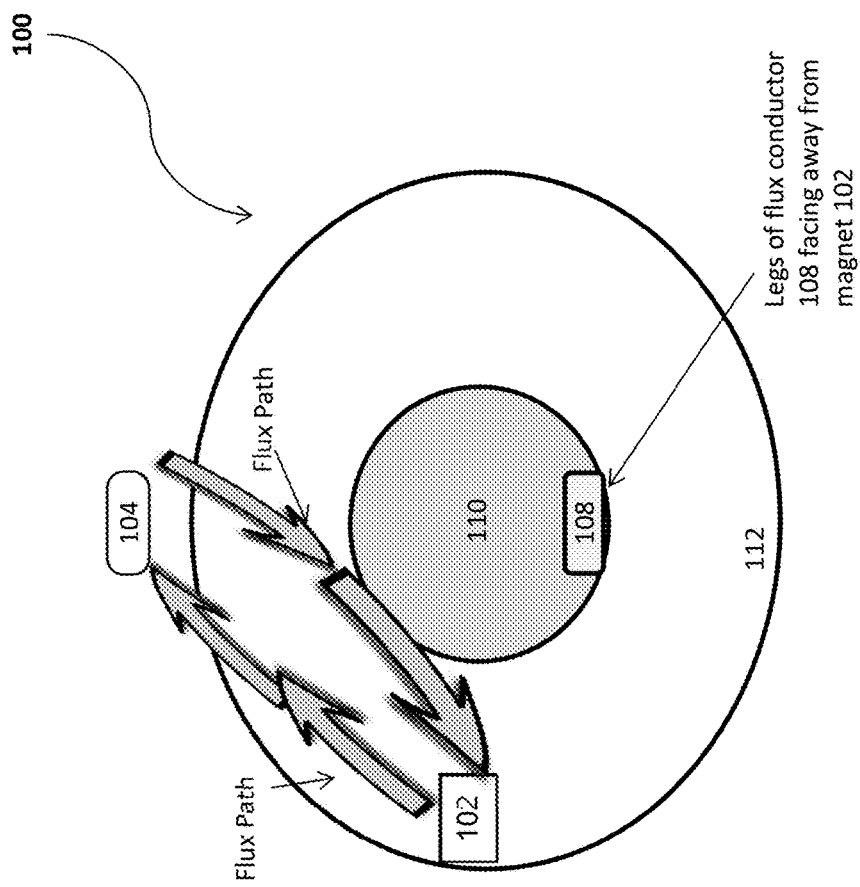
FIG. 3C is a front view of an exemplary rotation sensing device in accordance with exemplary embodiments.
Figure 3D:
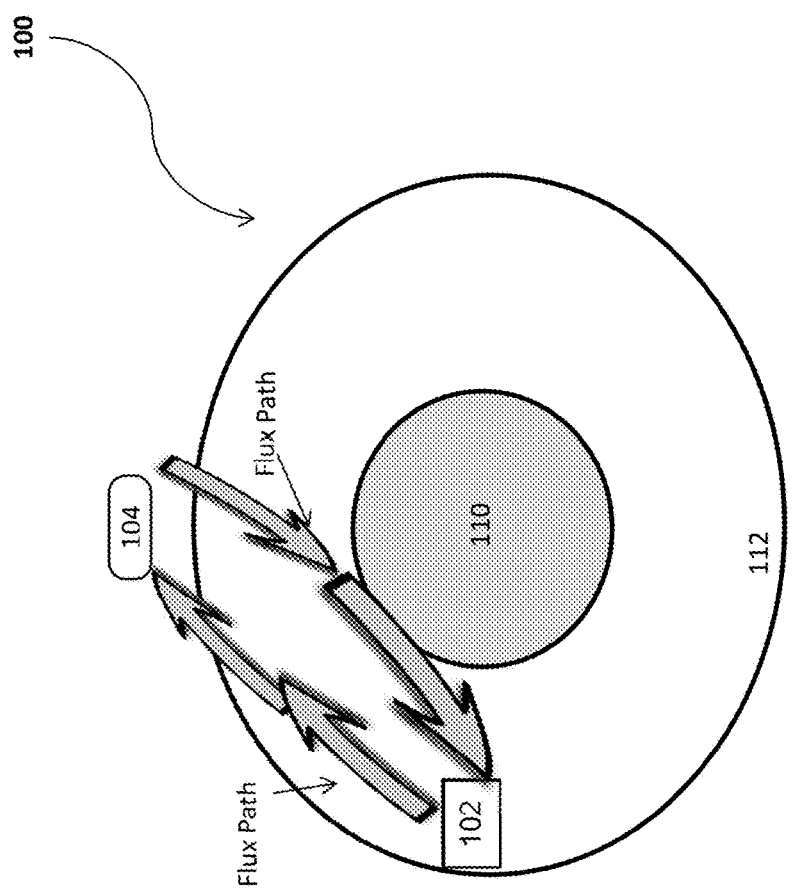
FIG. 3D is a front view of an exemplary rotation sensing device in accordance with exemplary embodiments.

FIG. 3C illustrates a front view of the rotation sensing device 100. As the rotatable element 110 rotates (e.g., based on consumption of a material, like natural gas), the flux conductor 108 (which may be mounted or fixed to the rotatable element 110) may also rotate, such as about the axis 101. The flux conductor 108 may rotate to a position, such as shown in FIG. 3C, such that the flux conductor 108 might not be located between the magnet 102 and the magnetic field sensor 104, such that the flux conductor 108 might not provide a low magnetic resistance flux path to divert (or otherwise diminish) the magnetic field generated by the magnet 102. For example, the magnet 102 and the magnetic field sensor 104 may be located a distance apart, such that the magnet 102's magnetic field may be sensed or detected by the magnetic field sensor 104, such as shown in FIG. 3D (e.g., in a default situation and/or if the flux conductor 108 is not diverting the flux path). In some embodiments, the flux conductor 108 may rotate to the position shown in FIG. 3C, so that the "open" end of the arch (i.e., the two legs of the flux conductor 108) may face away from the magnet 102 (i.e., not face toward the magnet 102). According to some aspects, the magnetic field sensor 104 may activate at time t2 responsive to detecting or sensing the magnetic field, and may generate a high signal indicating an activated state, such as shown in FIG. 2B.

According to some aspects, as the flux conductor 108 rotates, the flux conductor 108 may again divert the flux path between the magnet 102 and the magnetic field sensor 104 (e.g., such as if the flux conductor 108 reaches the position shown in FIG. 3B), such that the magnetic field sensor 104 might not detect the magnetic field, deactivate (or otherwise be non-activated), and generate a low signal at t3 indicating a deactivated state, as shown in FIG. 2B. The magnetic field sensor 104 may continue to generate such a signal shown in FIG. 2B based on the rotation of the flux conductor 108. For example, the magnetic field sensor 104 may activate at time t4 responsive to detecting or sensing the magnetic field.

According to some aspects, and as described above with respect to FIGS. 3A-3C in the context of a meter, the rotation sensing device 100 may be used to sense or count rotations of the rotatable element 100 (e.g., a rotating index hand), which can measure or indicate the amount of consumption of a quantity of material (e.g., gas, electricity, water, time, etc.). For example, the processing device 120 may count a full rotation based on the signals produced by the magnetic field sensor 104. In one example, with respect to FIGS. 3A-3C, the processing device 120 may count a full rotation if the magnetic field sensor 104 generates a low signal and a high signal. Other permutations and combinations may be used by the processing device 120 to count a rotation or a partial rotation.

Figure 4:
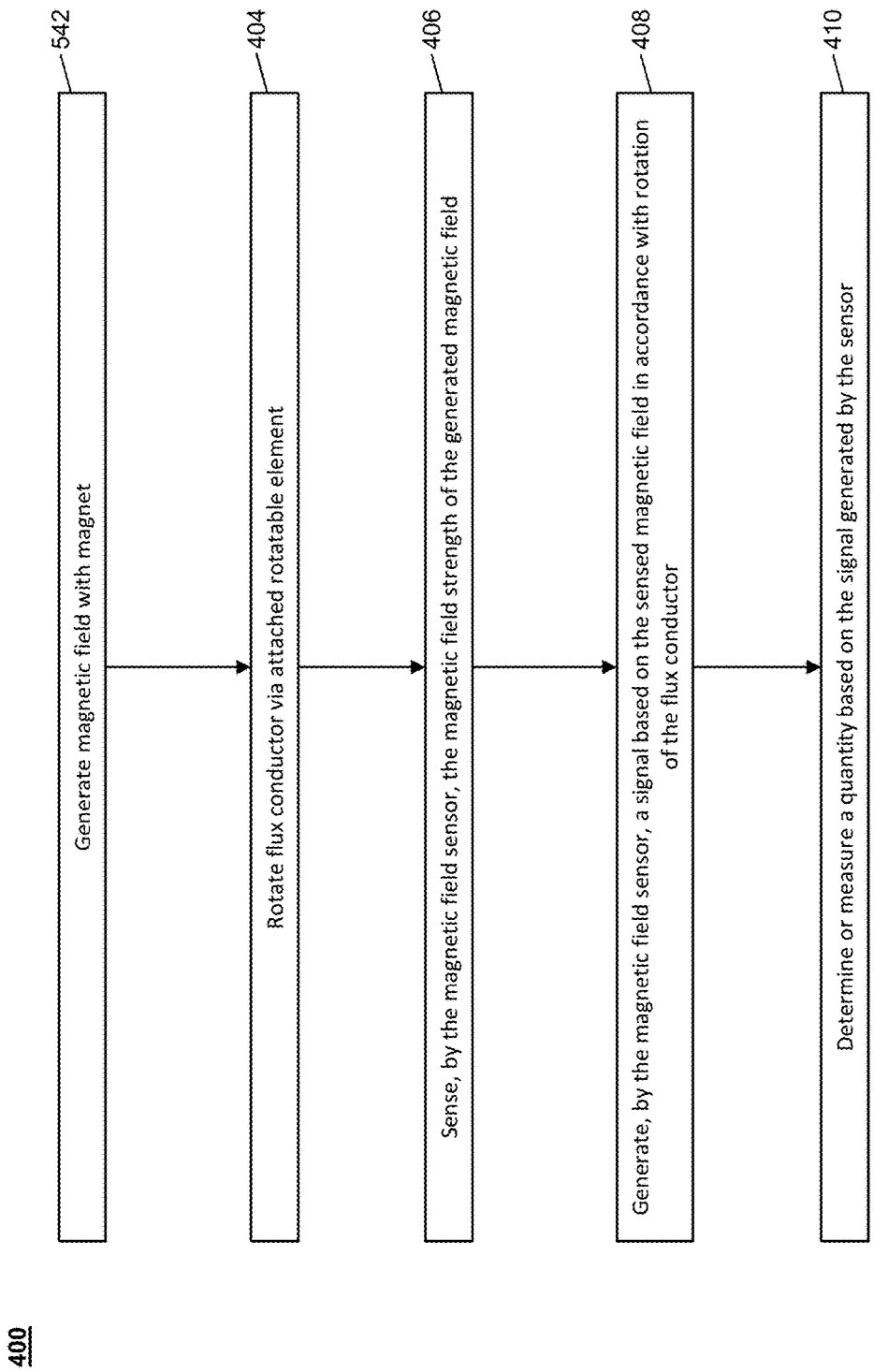
FIG. 4 is a flow chart illustrating an exemplary method for sensing rotation in accordance with exemplary embodiments.

FIG. 4 is an exemplary process 400 for sensing rotation, such as via the rotation sensing device 100, such as one described above with respect to FIGS. 1A-1D, 2A, 2B, and 3A-3D. In some embodiments, the rotation sensing device 100 may be a metering device, such as a gas meter, parking meter, water meter, electricity meter, etc. One or more steps of the process 400 may be implemented by a processing device, such as the processing device 120 or other computing device, and may be implemented as computer-readable code. For example, one or more steps of the process 400 may be implemented using hardware, software, firmware, non-transitory computer readable media having instructions stored thereon, or a combination thereof and may be implemented in one or more computer systems or other processing systems. The process 400 may start at any step or may end after any step.

At step 402, the magnet 102 of the rotation sensing device 100 may generate a magnetic field. At step 404, the flux conductor 108 of the rotation sensing device 100 may rotate relative to the fixed magnet 102. The flux conductor 108 may alter the generated magnetic field based on rotation of the flux conductor 108. For example, the flux conductor 108 may provide a low magnetic resistance flux path for the generated magnetic field to follow, such as responsive to the flux conductor 108 being aligned with the magnetic field generated by the magnet 102.

In some embodiments, the flux conductor 108 may rotate to a position such that may enhance a flux path between the magnet 102 and a magnetic field sensor 104 may be enhanced. In some embodiments, the flux conductor 108 may rotate to a position such that might not enhance or might no longer enhance a flux path between the magnet 102 and a magnetic field sensor 104.

At step 406, the magnetic field sensor may sense the magnetic field strength of the generated magnetic field. At step 408, the magnetic field sensor 104 may generate a signal based on the sensed magnetic field, such as via the circuit board 118 and/or processing device 120. At step 410, the processing device 120 (or other device) may determine or measure a quantity based on the signal generated by the magnetic field sensor 104.

While various exemplary embodiments of the disclosed system and method have been described above it should be understood that they have been presented for purposes of example only, not limitations. For example, various embodiments have been described in the context of a meter that is used to measure consumption of a commodity. It will be appreciated, however, that the principles disclosed herein are not limited to such, but rather can be applied in any context where sensing of rotation is desirable. Modifications and variations are possible in light of the above teachings or may be acquired from practicing of the disclosure, without departing from the breadth or scope.

What is claimed is:

1. A rotation sensing device comprising:
   a magnet;
   a magnetic field sensor located in a fixed position relative to the magnet, the magnetic field sensor configured to sense a magnetic field of the magnet; and
   a flux conductor configured to alter the magnetic field of the magnet, wherein the flux conductor is mounted to a rotatable element,
   wherein the magnet is mounted in a fixed position relative to the flux conductor,
   wherein the magnetic field sensor is configured to generate a signal based on a sensed strength of the magnetic field in accordance with rotation of the flux conductor.

2. The rotation sensing device of claim 1, wherein when the flux conductor is rotated by the rotatable element to a first position, the magnetic field sensor is configured to sense a higher magnetic field strength than when the flux conductor is rotated by the rotatable element to a second position.

3. The rotation sensing device of claim 2, wherein a length of the flux conductor is longer than a width of the flux conductor, and wherein when the flux conductor is rotated by the rotatable element to the first position, the flux conductor is longitudinally aligned between the magnet and the magnetic field sensor.

4. The rotation sensing device of claim 2, wherein a length of the flux conductor is longer than a width of the flux conductor, and wherein when the flux conductor is rotated by the rotatable element to the second position, the flux conductor is oriented transverse to a path from the magnet to the magnetic field sensor.

5. The rotation sensing device of claim 2, wherein when the flux conductor is rotated by the rotatable element to the first position, the flux conductor is located between the magnet and the magnetic field sensor.

6. The rotation sensing device of claim 2, wherein when the flux conductor is rotated by the rotatable element to the second position, the flux conductor is not located between the magnet and the magnetic field sensor.

7. The rotation sensing device of claim 1, wherein the magnetic field sensor comprises a reed switch, a Hall effect sensor, or a magneto-resistive element.

8. The rotation sensing device of claim 1, wherein the rotatable element is a rotatable dial of a meter.

9. The rotation sensing device of claim 8, wherein the meter is a gas meter.

10. The rotation sensing device of claim 2, wherein the magnet and the magnetic field sensor are spaced apart based on a strength of the magnet field and on the sensitivity of the magnetic field sensor such that the sensed magnetic field strength is below a threshold value.

11. The rotation sensing device of claim 1, wherein a distance between the magnet and the magnetic field sensor is a function of the magnetic field strength of the magnet, such that the magnetic field is not sensed by the magnet field sensor in the absence of alteration by the flux conductor.

12. The rotation sensing device of claim 11, wherein rotation of the flux conductor is configured to enhance a magnetic flux path between the magnet and the magnetic field sensor to cause the magnetic field to be sensed by the magnetic field sensor.

13. The rotation sensing device of claim 1, wherein a distance between the magnet and the magnetic field sensor is a function of the magnetic field strength of the magnet, such that the magnetic field is sensed by the magnet field sensor in the absence of alteration by the flux conductor.

14. The rotation sensing device of claim 13, wherein rotation of the flux conductor is configured to divert a magnetic flux path between the magnet and the magnetic field sensor to cause the magnetic field strength to be not sensed by the magnetic field sensor.

15. The rotation sensing device of claim 1, wherein the flux conductor comprises a material with high relative permeability.

16. The rotation sensing device of claim 1, wherein the flux conductor comprises an arch shape configured to provide a low resistance path between poles of the magnet.

17. A method for sensing rotation, comprising:
generating a magnetic field by a magnet disposed at a fixed location;
altering the generated magnetic field via a flux conductor mounted to an element that rotates relative to the magnet;
sensing, by a magnetic field sensor, a magnetic field strength of the generated magnetic field, wherein the magnetic field sensor is located in a fixed position relative to the magnet; and
generating, by the magnetic field sensor, a signal based on the sensed magnetic field strength.

18. The method of claim 17, further comprising counting a rotation of the rotatable element based on the generated signal.

19. The method of claim 18, wherein counting the rotation of the rotatable element comprises generating the signal corresponding to alternating states of the magnetic field sensor.

20. The method of claim 17, further comprising:
rotating, by the rotatable element, the flux conductor to a first position; and
generating, by the magnetic field sensor, a signal indicating an activated state of the magnetic field sensor.

21. The method of claim 20,
wherein a length of the flux conductor is longer than a width of the flux conductor, and
wherein rotating the flux conductor to the first position comprises longitudinally aligning the flux conductor between the magnet and the magnetic field sensor, to thereby enhance a flux path between the magnet and the magnetic field sensor.

22. The method of claim 20, wherein rotating the flux conductor to the first position comprises positioning the flux conductor to be outside of a path between the magnet and the magnetic field sensor.

23. The method of claim 17, further comprising:
rotating, by the rotatable element, the flux conductor to a first position; and
generating, by the magnetic field sensor, a signal indicating a deactivated state of the magnetic field sensor.

24. The method of claim 23,
wherein a length of the flux conductor is longer than a width of the flux conductor, and
wherein rotating the flux conductor to the first position comprises arranging the flux conductor transverse to a path between the magnet and the magnetic field sensor to thereby divert a flux path away from the magnetic field sensor.

25. The method of claim 23, wherein rotating the flux conductor to the first position comprises positioning the flux conductor to be between the magnet and the magnetic field sensor.

26. The method of claim 17, further comprising determining a quantity associated with a meter based on the generated signal.

27. The method of claim 26, wherein the meter comprises a gas meter.

* * * * *